US008562156B2

(12) United States Patent
Yinko, Jr. et al.

(10) Patent No.: US 8,562,156 B2
(45) Date of Patent: Oct. 22, 2013

(54) MIRROR FOR IMPROVED VISIBILITY OF DANGER ZONE AREA ON RIGHT SIDE OF SCHOOL BUSES

(75) Inventors: Richard H. Yinko, Jr., Sheboygan, WI (US); Gloria Buley, Shokan, NY (US)

(73) Assignee: Gloria M. Buley, Shokan, NY (US)

( * ) Notice: Subject to any disclaimer, the term of this patent is extended or adjusted under 35 U.S.C. 154(b) by 698 days.

(21) Appl. No.: 12/699,517

(22) Filed: Feb. 3, 2010

(65) Prior Publication Data
US 2010/0208374 A1    Aug. 19, 2010

Related U.S. Application Data

(63) Continuation-in-part of application No. 12/169,416, filed on Jul. 8, 2008, which is a continuation of application No. 11/690,620, filed on Mar. 23, 2007, now Pat. No. 7,407,299, which is a continuation of application No. 10/702,347, filed on Nov. 6, 2003, now Pat. No. 7,210,802.

(51) Int. Cl.
*G02B 5/08* (2006.01)
*G02B 7/18* (2006.01)
*G02B 5/10* (2006.01)

(52) U.S. Cl.
USPC ............................. 359/857; 359/841; 359/864

(58) Field of Classification Search
USPC .......... 359/841, 850, 855, 856, 857, 858, 864
See application file for complete search history.

(56) References Cited

U.S. PATENT DOCUMENTS

| | | | |
|---|---|---|---|
| 3,612,667 A | 10/1971 | Orr | |
| 5,572,201 A * | 11/1996 | Graham et al. | 340/902 |
| 5,666,227 A | 9/1997 | Ben-Ghiath | |
| 6,009,650 A | 1/2000 | Lamparter | |
| 6,059,418 A | 5/2000 | Edwards | |
| 6,099,933 A | 8/2000 | Lamparter | |
| 6,273,574 B1 | 8/2001 | Phillips | |
| 6,883,923 B2 | 4/2005 | Englander | |
| 7,210,802 B2 * | 5/2007 | Buley | 359/850 |
| 7,407,299 B2 * | 8/2008 | Buley | 359/857 |
| 7,407,300 B2 * | 8/2008 | Buley | 359/857 |

FOREIGN PATENT DOCUMENTS

| | | |
|---|---|---|
| GB | 2085382 | 4/1982 |
| WO | WO 90/12705 | 11/1990 |
| WO | WO 93/24345 | 12/1993 |

* cited by examiner

*Primary Examiner* — Alessandro Amari
(74) *Attorney, Agent, or Firm* — McAndrews, Held & Malloy, Ltd.

(57) ABSTRACT

The present invention relates to a mirror and mirror system which can be used in connection with large vehicles, such as school buses, to provide the driver of such vehicles with the ability to view the entire side of the vehicle. While such vehicles currently include side view mirrors attached to the front of the vehicle, these mirrors contain blind spots, such as the area immediately in front of the rear wheel of the vehicle. The current invention overcomes such blind spots by attaching a second mirror to the rear portion of the vehicle that provides a forward view from the rear of the vehicle, including a view of such blind spots. Such front and rear mirrors may be aligned so that the view of the rear mirror is portrayed within the view of the front mirror. As such, the present invention provides the driver with a complete view of the passenger side of the vehicle.

20 Claims, 9 Drawing Sheets

MIRROR FOR IMPROVED VISIBILITY OF DANGER ZONE AREA ON RIGHT SIDE OF SCHOOL BUSES

RELATED APPLICATIONS

This application is a continuation-in part of application Ser. No. 12/169,416 filed on Jul. 8, 2008, which is a continuation of application Ser. No. 11/690,620 filed Mar. 23, 2007 and issued as U.S. Pat. No. 7,407,300, which is a continuation of application Ser. No. 10/702,347 filed Nov. 6, 2003 and issued as U.S. Pat. No. 7,210,802. Each of the above-identified applications are incorporated by reference herein in their entirety.

FIELD OF THE INVENTION

This invention relates to school buses and other large vehicles and is directed to reducing fatalities among school age children and reducing the incidence of accidents involving children, adults, cars and the like. It is more particularly directed to mirror systems for buses and other vehicles.

BACKGROUND OF THE INVENTION

In the last 11 years, school buses have been involved in an average of 26,000 accidents each year, according to the NASS-GES (National Automotive Sampling System-General Estimates System) and the National Highway Traffic Safety Administration. During this same period, an average of 19 school-age children have been killed in accidents labeled "By Own Bus." Over the last 30 years, the record is even worse: During that period, an average of one child in the U.S. has been killed by his or her own bus each school week (National Highway Traffic Safety Administration, 2000).

Children are at the greatest risk in what is known as the "Danger Zone," a ten foot area on each side of the bus. A child who has fallen under their bus, has unthinkingly crawled under the bus to retrieve a dropped item, or has been caught by an article of clothing under the right side of the bus cannot be seen by the driver of the bus.

One child was caught by the handrail of a bus on the drawstring of her coat, dragged 50 feet and then run over and killed. Another child was dragged 3-4 feet and lived, suffering a broken leg. Another child was caught by his mitten string, dragged, and run over and killed. A child who escaped unharmed had crawled under the bus to place a milk carton in front of the right rear tire, in order to watch the bus crush it. The driver counted one child short and went to look. (Congressional Record Vol. 141, No. 62, 1995).

In all these cases, the child in peril was invisible to the driver, despite the existence of six mirrors on most school buses. State laws typically require bus drives to be buckled, and the most dangerous area near the right rear tire cannot be seen by the bus driver from his or her seat.

In light of these tragedies, the National Safety Transportation Association, National Association for Pupil Transportation recommends the following life saving procedures: "Before moving your bus know where the children are who have just disembarked. Don't move until you're certain you know where they are. If you have lost track of a child, do not move the bus, shut off and secure the bus, take the key, get out, and check around and underneath the bus. Err on the side of caution."

Although these recommendations make sense, and have undoubtedly saved lives on many occasions, experienced bus drivers point out that leaving a bus may not be practical in some instances: With 60 children on a bus, leaving the bus invites the possibility that one of the unruly children will bully and hurt another child or even release the emergency brake. In addition, experienced bus drivers report that an outbreak of hitting and yelling in the back of the bus often requires the driver to look back in the bus to check on the present danger that someone is being hurt. Such a distraction often makes it difficult or impossible to keep accurate count of the children who have left the bus. Anyone who has ridden a school bus regularly will recall such distractions. Drivers report that a group of children sometimes becomes so uncontrollable that the drivers' only recourse is to radio the dispatcher to send for the police to remove the offenders.

An additional problem comes when other drivers pass illegally on the right of the bus. Surprising as it may seem, impatient drivers who pass on the right side of the bus also cause the deaths of school children. Even when children are not involved, a car pulling up on the right side of the bus may be unnoticed if it stops in the area not visible from the driver's seat. Seeing that the way appears clear for a right turn, the bus driver may turn into, and damage, the stopped vehicle.

In contrast to previous attempts to provide visibility of the area near the right rear tire, the applicant has found that a large circular forward-looking mirror mounted at the right rear of the bus allows the driver to see the most critical areas on the right side of the bus, areas not previously visible from the driver's seat. In combination with the standard large rear view mirror on the right side of the bus, the new mirror makes it possible to see a child who has partially slipped under the bus, or to see a child who is caught on the bus by his mitten string, or to see an automobile that has moved into the blind area on the right side of the bus. In further combination with a large stop sign with blinking stop lights on the back of the subject mirror, the driver considering passing on the right has additional notice that such action is illegal when the bus is stopped.

SUMMARY OF THE INVENTION

It is the object of the present invention to provide improved visibility for the right side of a school bus.

It is a another object of the present invention to reduce fatalities among school children who are bussed to school each day.

It is a further object of the present invention to make use of a new motorized mirror at the right rear of the bus, in combination with an existing standard forward mounted right, rear view mirror, so that bus drivers can see the area near the right side of the bus and, in particular, to see children who might be endangered near or under the bus.

It is a further object of the present invention to provide a rear-mounted mirror that extends out when the bus is stopped but retracts when the bus starts moving to avoid hitting passersby with the mirror.

It is a still further object of the present invention to discourage bad drivers from passing on the right side of the bus, accomplished by providing a large stop sign with blinking red lights on the right hand side of the bus when the bus is stopped.

Other aspects, advantages and novel features of the present invention may be further understood by reference to the following detailed description of illustrated embodiment(s) of the invention taken in conjunction with the accompanying drawings.

DESCRIPTION OF ILLUSTRATIVE EMBODIMENTS

Figure 1:
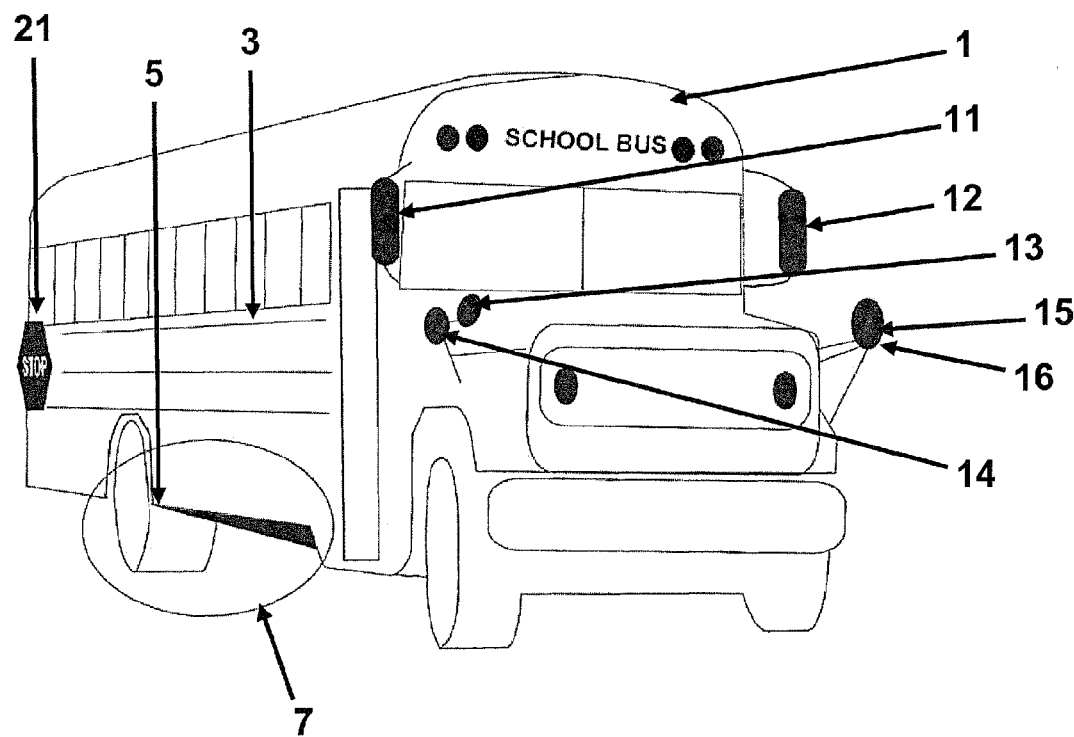
FIG. 1 shows the typical yellow school bus, with its standard complement of mirrors.

FIG. 1 shows the typical yellow school bus 1, with its standard complement of mirrors. Round mirrors 13 and 14 are intended to provide a view of the right front and right side of the bus, respectively. Round mirrors 15 and 16 are intended to provide a view of the left front and left side of the bus, respectively. Large rectangular mirrors 11 and 12 function as normal outside rear view mirrors, providing views of the following traffic on the right and left side of the bus, respectively, as well as additional view of the right and left side of the bus itself Danger zone 7, as shown in FIG. 1, is not visible to the driver in any mirror.

FIG. 1 also shows the a mirror system 21 mounted on the right rear of the bus. Mirror system 21 includes a forward facing mirror 23, such as the Convex Plexiglas Mirror made by C.R. Laurence Company of Los Angeles Calif. and commonly used in factories, for example, to provide visibility around blind corners. Although it is preferred that this second mirror 23 is relatively larger that mirror 11 so as to ensure that the driver has a complete view of the right side of the bus, mirror 23 need only be as large as is necessary to provide the driver with a view of danger zone 7.

Figure 2:
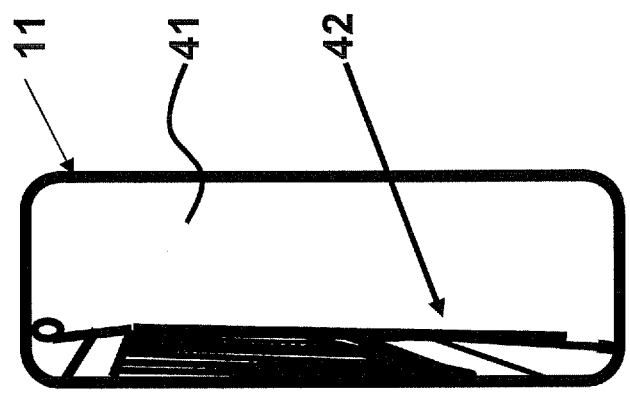
FIG. 2 shows the view in one of the right front mirrors seen by the bus driver of a typical yellow school bus.

FIG. 2 shows standard right rear view mirror 11 and its view 41 as seen from the perspective of the seated bus driver (not shown). The right side rear of the bus 42 can be plainly seen, but the danger zone 7 is not visible.

Figure 3:
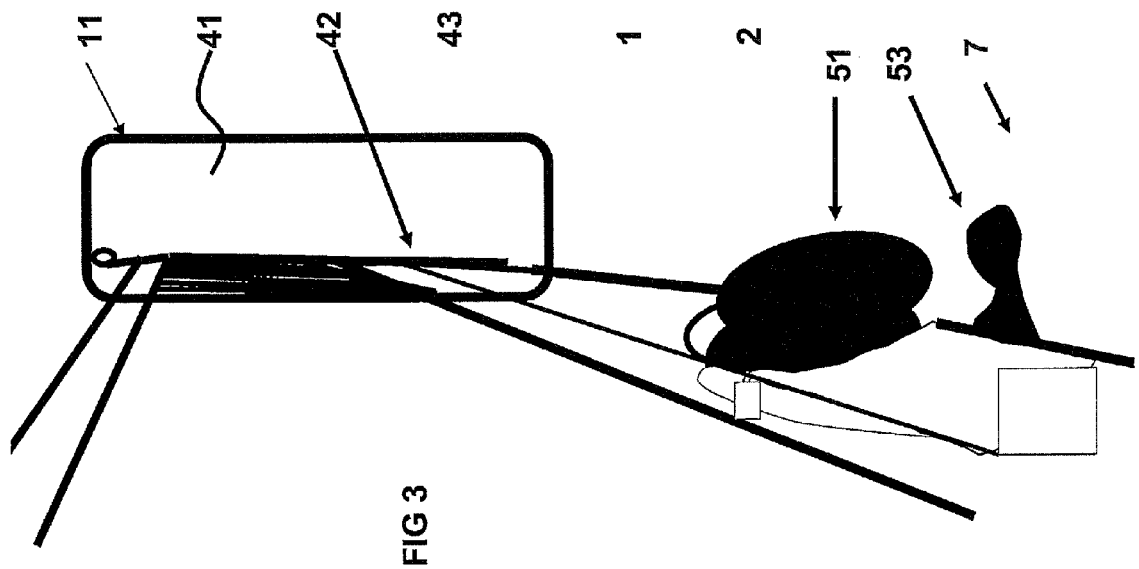
FIG. 3 shows those areas of the right side of a typical school bus that cannot be seen by the driver through the typical right front mirrors.

FIG. 3 again shows the standard right rear view mirror 11 and its view 41 as seen from the perspective of the seated bus driver (not shown), along with those area on the right side of the bus which are not in the bus driver's view, a/k/a the danger zone 7. In particular, neither the right front wheel 55 (not shown) nor the rear wheel 51 of the bus is visible in mirror 11. The presence of a child 53 who had crawled under the bus in front of the rear wheel 51 cannot be seen in mirror 11 or in any other present mirror.

Figure 4:
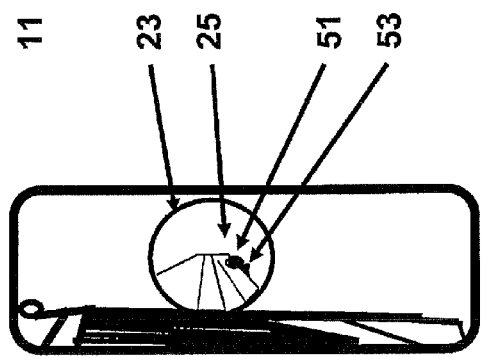
FIG. 4 shows the view seen by the bus driver in the right front mirror when the forward looking mirror assembly of the present invention has been mounted near the rear of the bus, with the rear facing stop sign mounted to the back of the mirror (not shown) and a child in front of the right rear tire.

FIG. 4 shows the view seen in rearward facing mirror 11 when the forward facing mirror 23 of the present invention has been mounted and extended. Note that now mirror 23 may include a view 25 which includes a view of the danger zone 7, including the rear wheel 51 and child 53 who may have crawled under the wheel.

Figure 5:
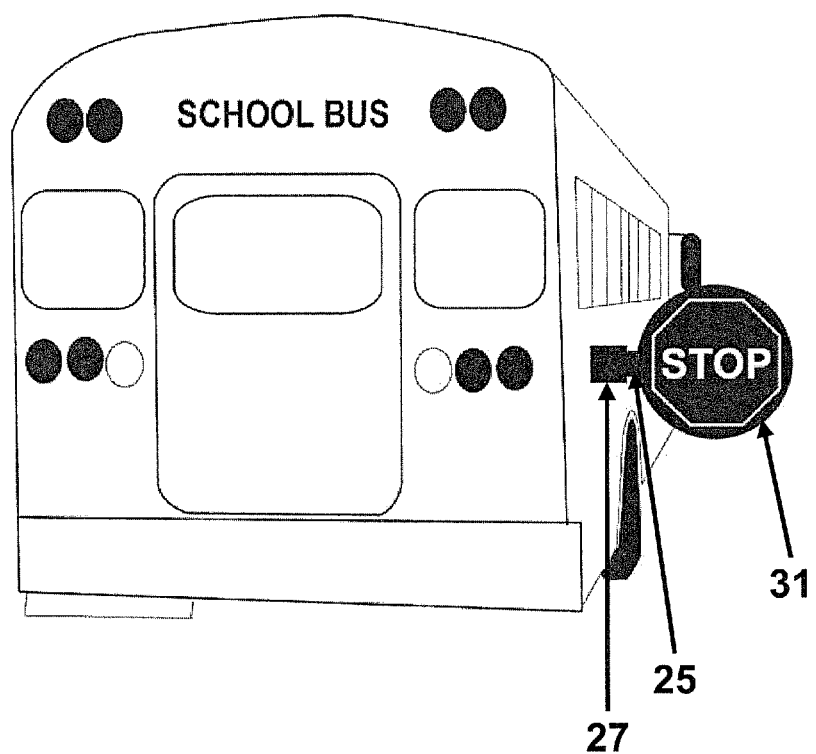
FIG. 5 shows the stop sign mounted on the rear of the forward looking mirror of the present invention after it has been extended.

FIG. 5 shows the preferred mirror system 21 of the present invention. Mirror system 21 may contain a rearward facing stop sign 31, which preferably is attached to the backside of mirror 23. Mirror assembly 21 is mounted with arm 25 to motor 27 which may be operated by the driver to swing the mirror assembly 21 out at approximately right angles to the bus to provide visibility of the right side wheels of the bus, thereby notifying other people located behind the bus that the driver has brought the bus to a stop and that children may be exiting. Stop sign 31 may also contain blinking red stop lights in the manner common to some bus stop signs which swing out to warn following and oncoming traffic to stop while children are exiting.

Figure 6:
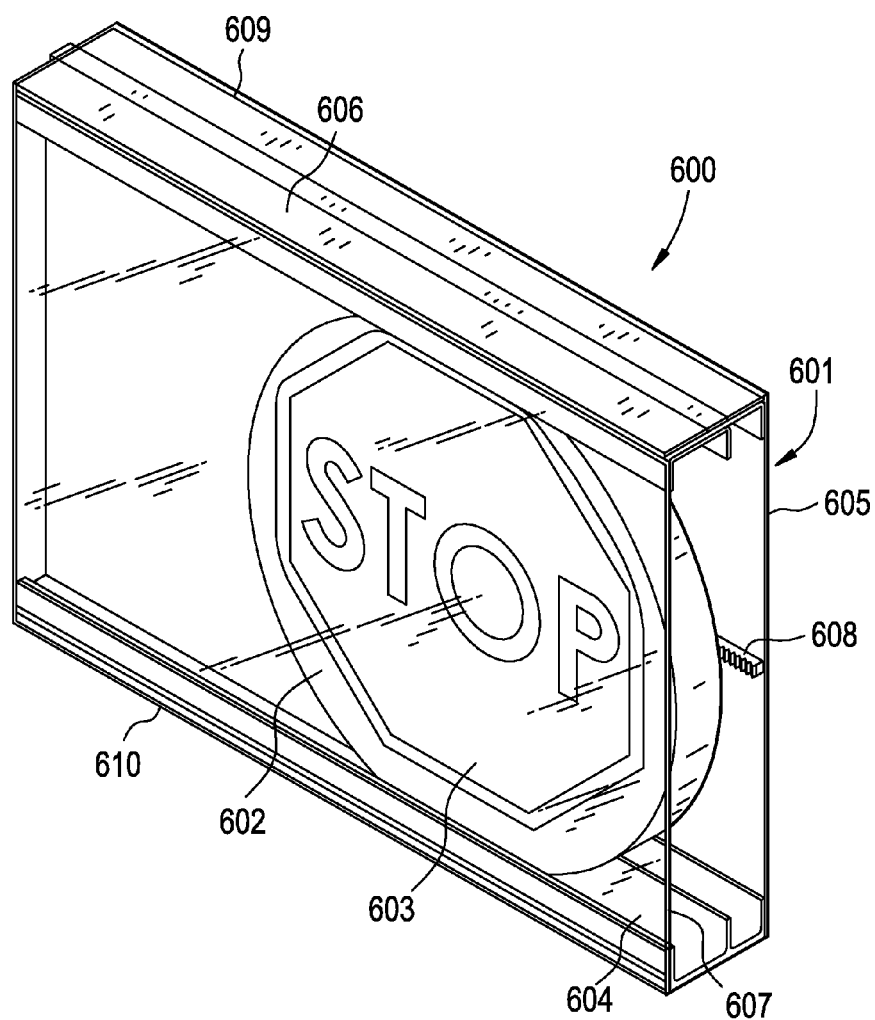
FIG. 6 depicts a deployable stop sign system.

FIG. 6 depicts a deployable stop sign system 600. The system 600 includes a housing 601 and a deployable sign 602. The sign 602 includes a stop sign 603 on one side and a mirror 702 (depicted in FIGS. 7 and 9) on the opposite side. The housing 601 includes walls 605, 607, 609, 610. Disposed within the housing are guides 604, 606 and deployment mechanism 608. The sign 602 is configured to be deployable such that sign 602 translates about guides 604, 606 using deployment mechanism 608. When the sign 602 is in a fully deployed position, stop sign 603 and mirror 702 are completely out of housing 601. When the sign 602 is in a fully recessed position, stop sign 603 and mirror 702 are completely within housing 601. In certain embodiments, deployment mechanism 608 comprises a rack and pinion operably connected to a control system comprising circuitry and software. The control system can be used to control deployment of the sign 602 using deployment mechanism 608.

Figure 7:
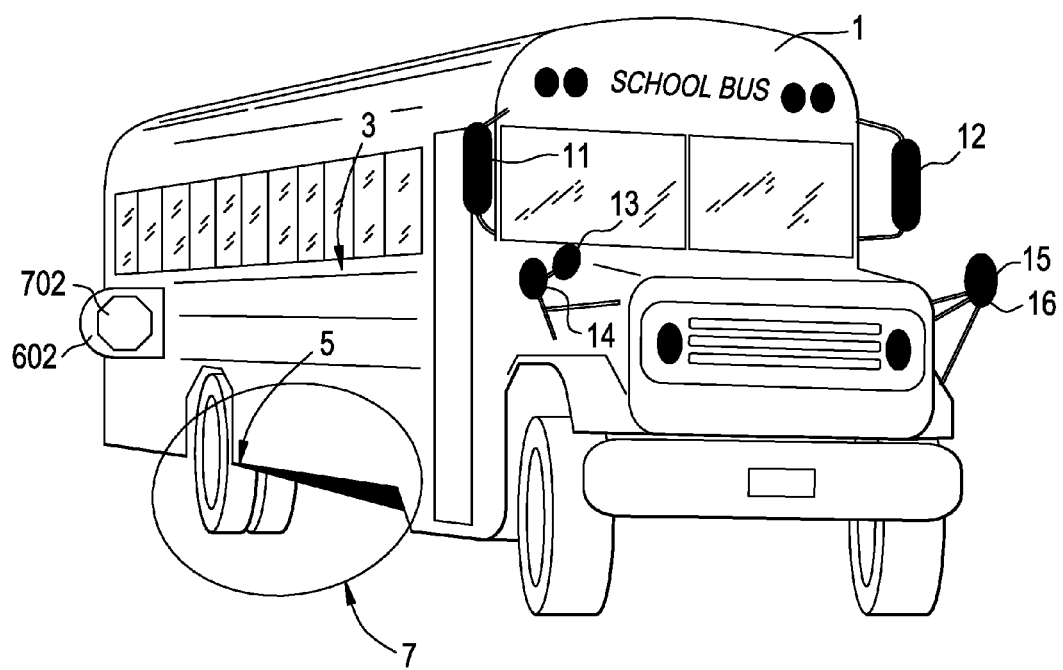
FIG. 7 depicts stop sign system mounted toward a rear end of a passenger side of a bus, the stop sign system in a fully deployed position.
Figure 8:
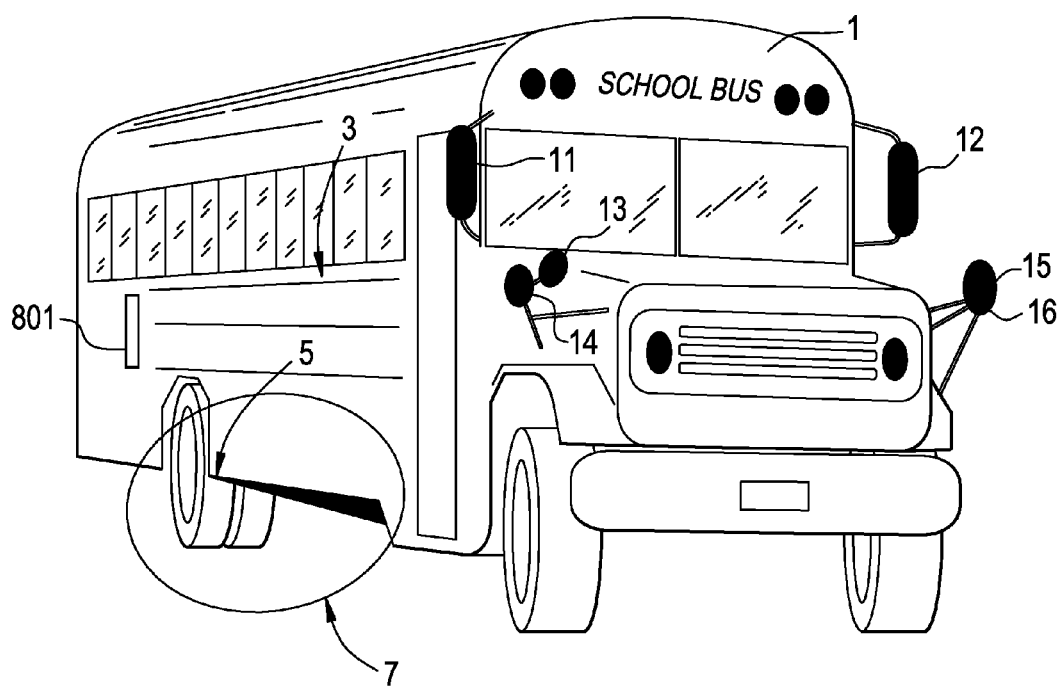
FIG. 8 depicts the stop sign system of FIG. 7 in a fully recessed position.

As depicted in FIG. 7, The deployable stop sign system can be mounted toward a rear end of a passenger side of a bus such that the housing is disposed within the bus. FIG. 7 depicts sign 602 in a fully deployed position where mirror 702 faces toward the front of the bus, and stop sign 603 faces toward the rear of the bus. In the fully deployed position, sign 602 is substantially perpendicular to the side of the bus and can provide a view of danger area 7 (for example, under the vehicle and between a rear wheel of the vehicle and a front wheel of the vehicle) on the right side of the bus to the driver via the passenger side mirror 11. In the fully recessed position depicted in FIG. 8, sign 602 is disposed in the housing inside the bus. FIG. 8 depicts opening 801 through which sign 602 can be deployed.

Figure 9:
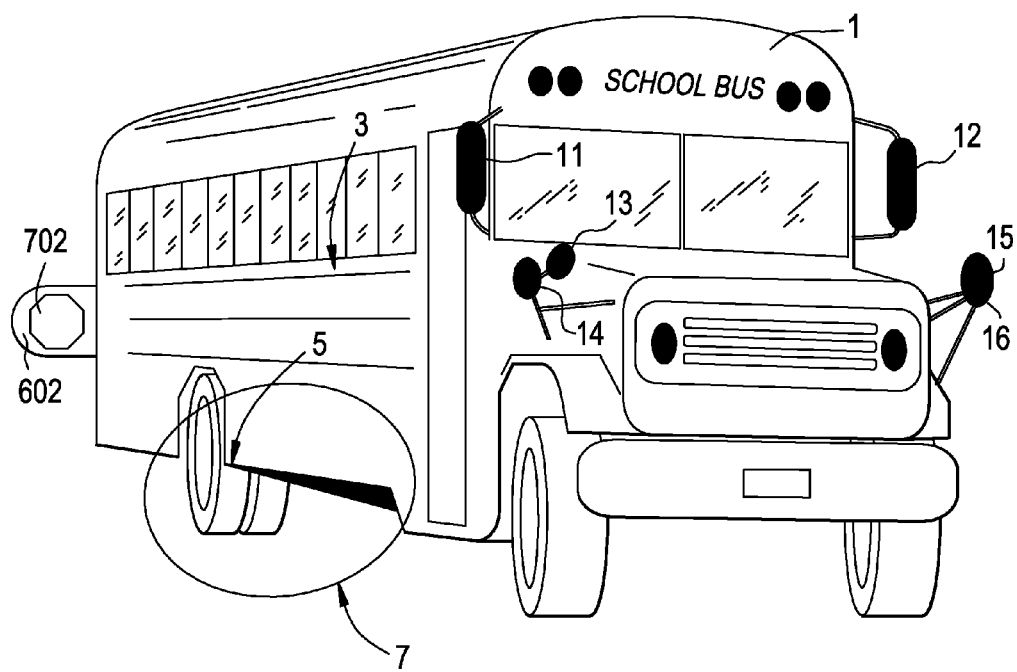
FIG. 9 depicts stop sign system mounted toward a rear end of a passenger side of a bus, the stop sign system in a fully deployed position.
Figure 10:
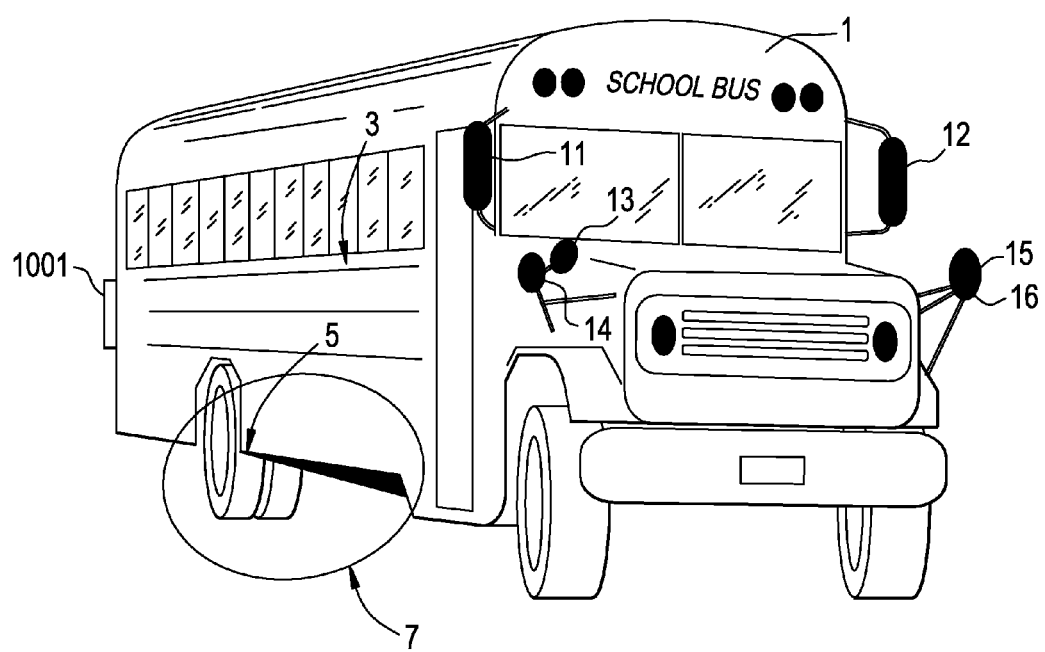
FIG. 10 depicts the stop sign system of FIG. 9 in a fully recessed position.

As depicted in FIG. 9, The deployable stop sign system can be mounted toward a rear end of a passenger side of a bus such that the housing is disposed behind the bus. FIG. 9 depicts sign 602 in a fully deployed position where mirror 702 faces toward the front of the bus, and stop sign 603 faces toward the rear of the bus. In the fully deployed position, sign 602 is substantially perpendicular to the side of the bus and can provide a view of the danger area 7 (for example, under the vehicle and between a rear wheel of the vehicle and a front wheel of the vehicle) on the right side of the bus to the driver via the passenger side mirror 11. In the fully recessed position depicted in FIG. 10, sign 602 is disposed in the housing behind the bus. FIG. 10 depicts opening 1001 through which sign 602 can be deployed.

In operation, the deployable stop sign system 600 can be installed inside the right side (passenger side) of a vehicle toward the rear of the vehicle, including behind the vehicle. Sign 603 can be deployed from a fully recessed position (where the stop sign 603 and mirror 702 are disposed within the housing) to a fully deployed position (where the stop sign 603 and mirror 702 are completely outside the housing) using deployment mechanism 608 and guides 604, 606. In the fully deployed position, sign 602 can be substantially perpendicular to the side of the vehicle and can provide a view of the danger area 7 (for example, under the vehicle and between a rear wheel of the vehicle and a front wheel of the vehicle) on the right side of the vehicle to the driver via the passenger side mirror 11.

While several embodiments of the invention have been described hereinabove, those of ordinary skill in the art will recognize that these embodiments may be modified and altered without departing from the central spirit and scope of the invention. Thus, the preferred embodiments described hereinabove are to be considered in all respects as illustrative and not restrictive, the scope of the invention being indicated by the appended claims rather than by the foregoing description. Therefore, it is the intention of the inventors to embrace herein all such changes, alterations and modifications which come within the meaning and range of equivalency of the claims.

What is claimed is:

1. A mirror system for a vehicle comprising:
   a first mirror viewable from a driver's seat; and
   a second mirror deployable between a first position wherein the second mirror is disposed inside or behind the vehicle, and a second position wherein the second mirror is substantially perpendicular to a side of the vehicle, and wherein the second mirror is viewable through the first mirror from the driver's seat to provide a view of at least an area that is under the vehicle and between a rear wheel of the vehicle and a front wheel of the vehicle when in the second position.

2. The system of claim 1, wherein the second mirror is provided toward the rear of the vehicle.

3. The system of claim 1, wherein the area under the vehicle is located immediately forward of the rear wheel of the vehicle.

4. The system of claim 1, wherein the area under the vehicle includes at least a portion of the rear wheel of the vehicle.

5. The system of claim 1, wherein the second mirror is convex.

6. The system of claim 1, wherein the second mirror is larger than the first mirror.

7. The system of claim 1, further including a deployment mechanism configured to deploy the second mirror between the first position and the second position.

8. The system of claim 7, wherein the deployment mechanism comprises a rack and pinion operably connected to a control system, the rack and pinion configured to translate the second mirror about guides, thereby deploying the second mirror.

9. The system of claim 1, further including at least one red light fixed to the back of the second mirror and viewable from behind the vehicle.

10. The system of claim 1, wherein a stop sign is mounted on the back of the second mirror.

11. A mirror for use on a vehicle, wherein the mirror is deployable between a first position wherein the mirror is disposed inside or behind the vehicle, and a second position wherein the mirror is substantially perpendicular to a side of the vehicle and reflects toward the front of the vehicle, and wherein the mirror provides a driver of the vehicle a view of at least an area that is under the vehicle and between a rear wheel of the vehicle and a front wheel of the vehicle when in the second position.

12. The mirror of claim 11, wherein the mirror is provided toward the rear of the vehicle.

13. The mirror of claim 11, wherein the area under the vehicle is located immediately forward of the rear wheel of the vehicle.

14. The mirror of claim 11, wherein the area under the vehicle includes at least a portion of the rear wheel of the vehicle.

15. The mirror of claim 11, wherein a stop sign is mounted on the back of the mirror.

16. The mirror of claim 11, wherein the mirror is deployable between the first position and the second position using a deployment mechanism.

17. The mirror of claim 16, wherein the deployment mechanism comprises a rack and pinion operably connected to a control system, the rack and pinion configured to translate the mirror about guides, thereby deploying the mirror.

18. A method of viewing an area under a vehicle comprising: deploying a mirror between a first position wherein the mirror is disposed inside or behind the vehicle, and a second position wherein the mirror is substantially perpendicular to a side of the vehicle such that the mirror reflects toward a front of the vehicle and provides a driver of the vehicle a view of at least an area that is under the vehicle and between a rear wheel of the vehicle and a front wheel of the vehicle when in the second position.

19. The method of claim 18, wherein the mirror is deployable between the first position and the second position using a deployment mechanism.

20. The method of claim 19, wherein the deployment mechanism comprises a rack and pinion operably connected to a control system, the rack and pinion configured to translate the mirror about guides, thereby deploying the mirror.

\* \* \* \* \*